Aug. 4, 1942.   E. E. ARNOLD   2,292,031
SEAL
Filed Feb. 29, 1940   2 Sheets-Sheet 2
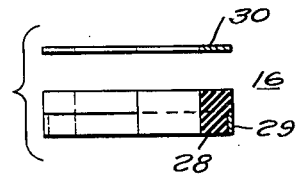
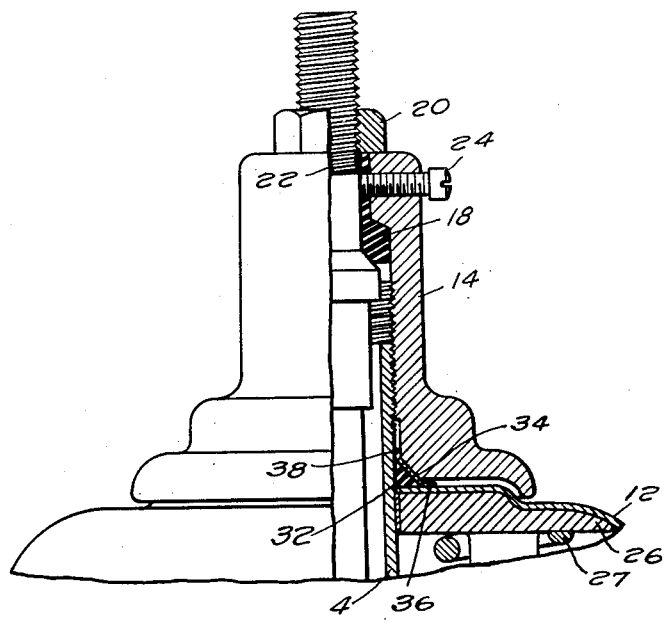
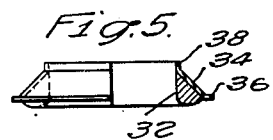
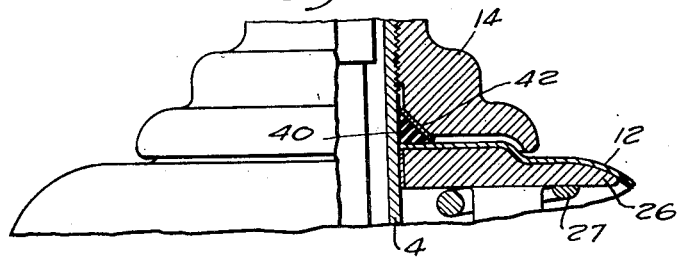
WITNESSES:
E. A. McCloskey
David Kreider
INVENTOR
Edwin E. Arnold.
BY
ATTORNEY Patented Aug. 4, 1942

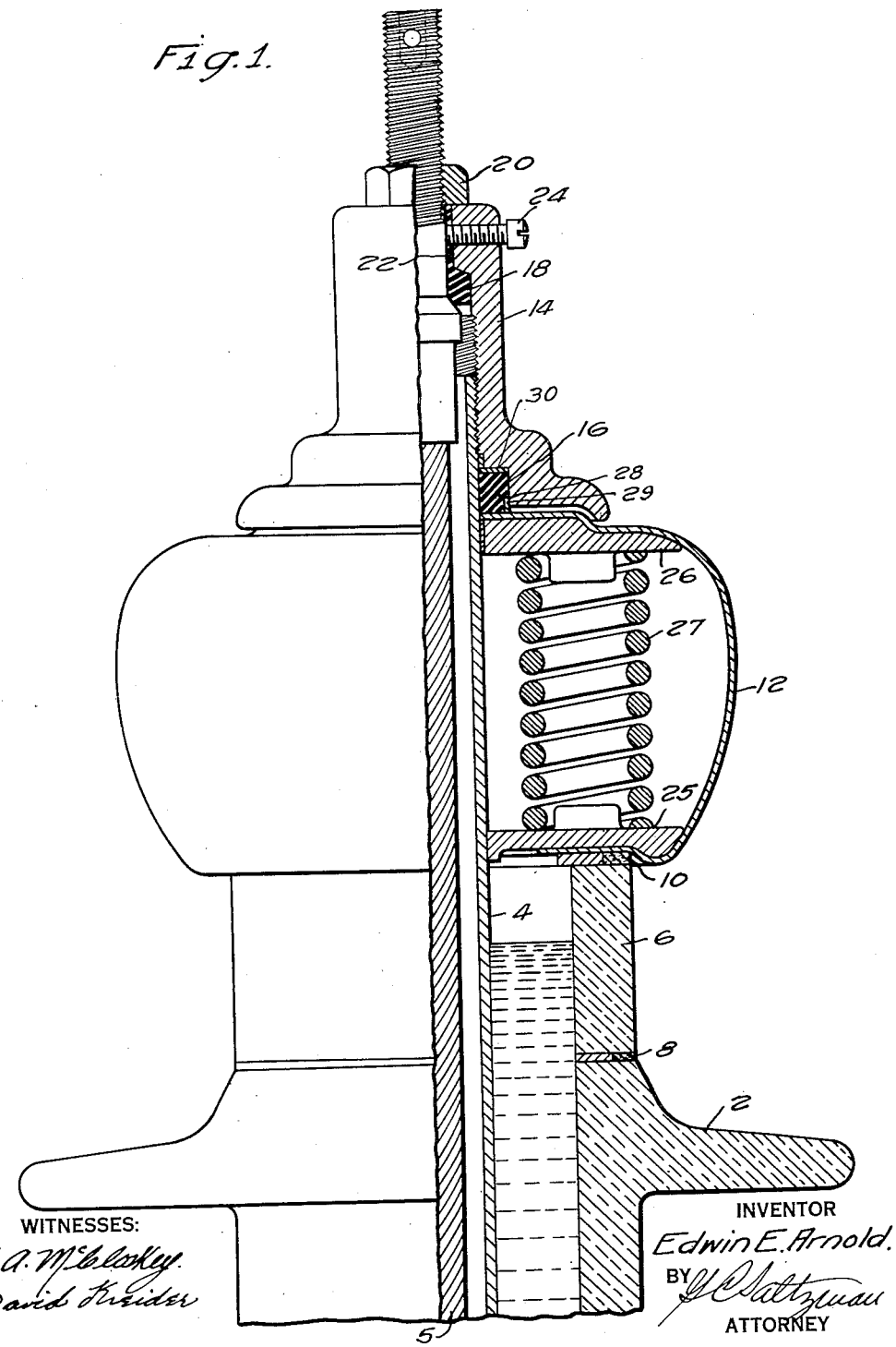

2,292,031

UNITED STATES PATENT OFFICE 2,292,031

SEAL

Edwin E. Arnold, Pittsburgh, Pa., assignor to Westinghouse Electric & Manufacturing Company, East Pittsburgh, Pa., a corporation of Pennsylvania Application February 29, 1940, Serial No. 321,512

3 Claims. (Cl. 174—31)

The present invention relates to a sealing means, and it has particular relation to a method and means for sealing the ends of insulating bushings, and the like.

Electrical insulating bushings comprise a casing of insulating material through which a metallic conductor extends. In such bushings the space between the casing and the conductor, or in the case where a fished-through lead is employed, the space between the casing and the sleeve enclosing the lead, is generally filled with additional dielectric or insulating means, such as oil or gum. With practically every kind of insulating means in use, it is particularly important that moisture and air be excluded from this space.

Because of advantages in assembly and other structural considerations, it is usual to employ gasket seals for these bushings. It has been found, however, that it is especially difficult to satisfactorily seal the joint between the casing cover and the conductor or conductor-enclosing sleeve. The present invention discloses a gasket structure which is particularly suitable for sealing this joint as well as for numerous analogous purposes.

It is, accordingly, an object of the present invention to provide new and improved gasket structure.

It is another object of the invention to provide an improved means for sealing the ends of insulating bushings and the like.

A further object of the invention is to provide a gasket structure which comprises a resilient gasket and a backing member for preventing plastic flow of the gasket material away from the joint which it seals.

Other objects and advantages of the invention will become evident from the following detailed description taken in conjunction with the accompanying drawings, in which:

Figure 1 is an elevational view, partly in section, of an insulating bushing embodying the invention;

Fig. 2 is a view, partly in vertical section, of the gasket structure employed in the apparatus of Fig. 1;

Figs. 3 and 4 are elevational views partly in section showing modification of the invention; and Figs. 5 and 6 are views similar to Fig. 2 illustrating the gaskets employed in the modifications of Figs. 3 and 4, respectively.

Referring to Fig. 1, there is shown an insulating casing 2 through which extends a hollow metallic member or stud 4. A flexible or fished-through conducting lead 5 extends through this hollow stud. Although a fished-through construction is shown, it will be evident that the invention may be employed where a rigid conductor is used.

A sight glass 6 is disposed on the top of the casing 2 with a gasket 8 therebetween. This gasket 8 is preferably of the two-piece construction disclosed in U. S. Patent No. 2,000,688 to Burr, et al. Another gasket 10 of the same type is disposed on top of the glass sleeve 6 and a flexible metallic cap 12 is placed thereon. A metallic nut 14 is threaded on the stud 4 to form a pocket for and compress a gasket which is indicated, generally, at 16. This gasket, which is constructed in accordance with the invention to effectively seal the joint between the top of the cap 12 and the metallic member 4, will be described in detail hereinafter. A bushing 18 of insulating material is disposed in the top of the nut between it and the conductor 5, while a nut 20 is threaded onto the conductor to support it in place. The bushing 18 is provided with a hole 22 through which a set-screw 24 extends to electrically connect the conductor and the nut 14.

Within the cap 12 and resting on the lower portion thereof is an annular plate 25 while a similar plate 26 is likewise disposed therein to engage its upper portion. A plurality of helical springs 27 are compressed between these two plates to exert a downward pressure on the gasket 10 and an upward pressure on the gasket 16.

Referring also to Fig. 2, the gasket 16 comprises a flexible portion 28 which may be of a rubberized material, such as that sold under the trade name of neoprene. This gasket is of substantially rectangular section and is cut away at its lower outer edge to receive a relatively thin metallic backing ring 29 which is preferably bonded thereto. A thin metallic slip washer 30 of the same configuration as a gasket may be disposed on top of it to permit tightening of the nut 14 when the apparatus is in service in the field without damaging the gasket material. It will be seen that compression of the gasket between the nut 14 and cap 12 will force the flexible material 28 inwardly and downwardly against the parts to be sealed. Because of the backing strip 29, however, it will be impossible for this material to flow outwardly from the joint between the two compressing members.

In the modification of the invention shown in Figs. 3 and 5, a gasket 32 of more or less triangular cross section is provided. A backing member 34 of substantially conical configuration is bonded thereto, as described above. This strip 34 is bent as at 36 to engage the surface of the cap 12, while the upper end is bent as at 38 to engage the metallic member 4. As is shown in Fig. 3, when in assembled condition, the gasket material is pressed against the two surfaces to be sealed, but is completely confined so that it will not flow outwardly from the joint.

The embodiment shown in Figs. 4 and 6 comprises a resilient gasket 40 to which is bonded a conical backing member 42. In assembled condition, this backing strip likewise acts to confine the gasket material within the desired space and to prevent its flow away from the joint.

The advantages of a gasket of the type disclosed are believed to be evident. It is possible to exert an extremely high sealing pressure on it without there being any possibility of the material flowing away from the joint. The gasket effectively seals the interior of the apparatus on which the bushing is used from the atmosphere and from the interior of the bushing while at the same time sealing the bushing from the atmosphere. In addition, the backing member, which will usually be of metal, insures a definite electrical connection between the cap 12 and the nut 14 with a consequent reduction of interference to radio reception.

Although the invention has been described with reference to certain specific embodiments, it will be evident that modifications may be made without departing from its spirit and scope. Consequently, it is intended that the invention be limited only by the appended claims interpreted in view of the prior art.

I claim as my invention:

1. In an insulating bushing, a tubular insulating casing, a metallic stud extending axially therethrough, a metallic cap closing the end of said casing and having a central opening through which said stud extends, a clamping member secured to said stud to define an annular pocket thereabout at the opening in said cap, an annular gasket of resilient material disposed in said pocket to resiliently engage said stud, cap and clamping member to provide sealed joints therebetween, and an annular metallic ring secured to a portion of the surface of said gasket extending between said clamping member and said cap in contact therewith to prevent outward flow of the material of said gasket in response to a sealing pressure thereon.

2. In an insulating bushing, a tubular insulating casing, a metallic stud extending axially therethrough, a metallic cap closing the end of said casing and having a central opening through which said stud extends, a clamping member secured to said stud to form an annular pocket thereabout at the opening in said cap, an annular gasket of resilient material disposed in said pocket and compressed between said clamping member and said cap to resiliently engage the surfaces thereof and the surface of said stud, and an annular metallic ring secured to a portion of the outer surface of said gasket to have a portion thereof engaged by said clamping member, said ring extending from said clamping member to said cap to prevent outward flow of the material of said gasket in response to a sealing pressure thereon and provide continuous electrical connection between said clamping member and said cap.

3. In an insulating bushing, a tubular insulating casing, a metallic stud extending axially therethrough, a metallic cap closing the end of said casing and having a central opening through which said stud extends, a clamping nut secured to said stud to form an annular pocket of substantially rectangular cross section thereabout at the opening in said cap with the outer bounding surface thereof substantially concentric with said stud, an annular gasket of resilient material having a rectangular cross section disposed in said pocket and compressed between said clamping member and said cap to resiliently engage the surfaces thereof and the surface of said stud, said gasket having an annularly notched portion extending from an end of its outer side to an intermediate point thereof, and a thin annular metallic backing ring fitting within the notch in said gasket for engagement by the outer bounding surface of said pocket and contact with said cap to prevent outward flow of the material of said gasket in response to a sealing pressure thereon.

EDWIN E. ARNOLD.